US012681455B2

(12) United States Patent
Ozeki

(10) Patent No.: US 12,681,455 B2
(45) Date of Patent: Jul. 14, 2026

(54) CONTROL DEVICE

(71) Applicant: FANUC CORPORATION, Minamitsuru-gun (JP)

(72) Inventor: Shinichi Ozeki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 412 days.

(21) Appl. No.: 17/914,542

(22) PCT Filed: Mar. 26, 2021

(86) PCT No.: PCT/JP2021/012860
§ 371 (c)(1),
(2) Date: Sep. 26, 2022

(87) PCT Pub. No.: WO2021/200653
PCT Pub. Date: Oct. 7, 2021

(65) Prior Publication Data
US 2023/0143968 A1     May 11, 2023

(30) Foreign Application Priority Data
Apr. 2, 2020    (JP) ................................. 2020-066620

(51) Int. Cl.
*G05B 19/4093*         (2006.01)
(52) U.S. Cl.
CPC .................. *G05B 19/40937* (2013.01); *G05B 2219/35519* (2013.01)
(58) Field of Classification Search
CPC ............ G05B 19/409; G05B 19/40937; G05B 2219/32128; G05B 2219/35439; G05B 2219/35519; G05B 2219/36168
See application file for complete search history.

(56) References Cited

U.S. PATENT DOCUMENTS 6,502,007 B1 * 12/2002 Kanamoto ....... G05B 19/40937
700/173
2006/0018725 A1 * 1/2006 Ichino ..................... G01M 1/32
74/572.4

(Continued)

FOREIGN PATENT DOCUMENTS

CN          102686236 A      9/2012
CN          104793615 A      7/2015

(Continued)

OTHER PUBLICATIONS

International Search Report issued Jun. 15, 2021 in corresponding International Application No. PCT/JP2021/012860.

(Continued)

*Primary Examiner* — Tameem D Siddiquee
(74) *Attorney, Agent, or Firm* — Wenderoth, Lind & Ponack, L.L.P.

(57)          ABSTRACT

A control device is provided with: an extraction unit which extracts, on the basis of a machine configuration including the number of axes and/or the number of systems in a machine tool, a plurality of task items included in setup work for the next process in the machine tool, as essential settings or optional settings; a determination unit which dynamically determines, in accordance with operation details of setup work performed on the machine tool during a period from the completion of the latest process by the machine tool to the present point in time, whether each of the plurality of task items extracted as an essential setting or optional setting corresponds to an essential setting or an optional setting; and an action control unit which does not permit a process action of the machine tool if there is an essential setting which has not been completed or updated.

5 Claims, 11 Drawing Sheets

(56)         References Cited

U.S. PATENT DOCUMENTS

| 2006/0229761 | A1* | 10/2006 | Kita | .................. | G05B 19/4068 |
| | | | | | 700/181 |
| 2018/0150062 | A1* | 5/2018 | Shapiro | ............. | G05B 19/4093 |

FOREIGN PATENT DOCUMENTS

| JP | 4-70907 | | 3/1992 |
| JP | 6-170649 | | 6/1994 |
| JP | 6-250722 | | 9/1994 |
| JP | H11-143513 | A | 5/1999 |
| JP | 2000-126937 | | 5/2000 |
| JP | 2003-186510 | | 7/2003 |
| JP | 2011-167876 | | 9/2011 |
| JP | 2019-042847 | A | 3/2019 |
| WO | 2016/051544 | | 4/2016 |

OTHER PUBLICATIONS

Office Action issued Feb. 28, 2025 in CN Patent Application No. 202180025190.0, 5 pages.

* cited by examiner

Figure 1:
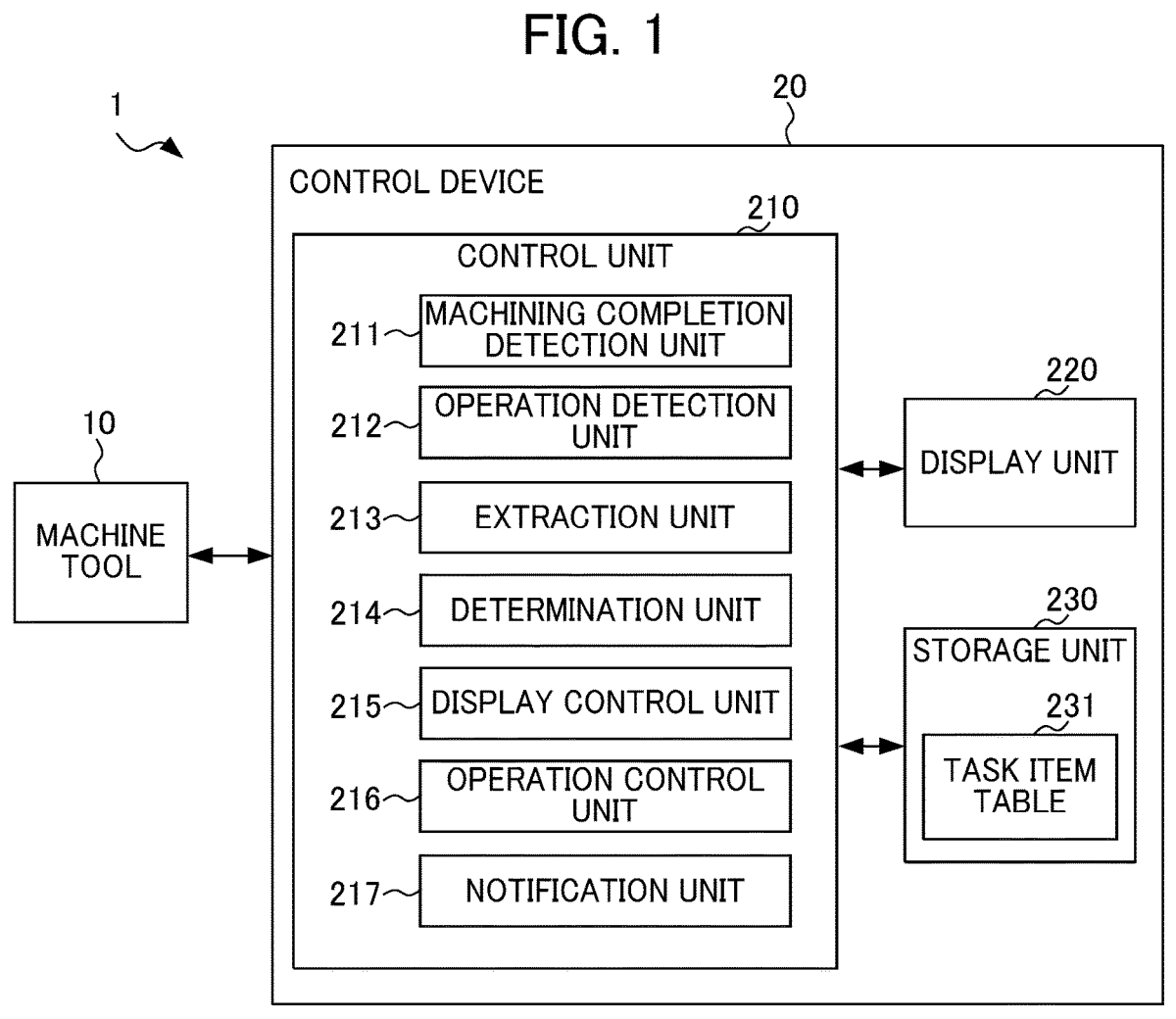

CONTROL DEVICE

210

CONTROL UNIT

211 — MACHINING COMPLETION DETECTION UNIT

212 — OPERATION DETECTION UNIT

213 — EXTRACTION UNIT

214 — DETERMINATION UNIT

215 — DISPLAY CONTROL UNIT

216 — OPERATION CONTROL UNIT

217 — NOTIFICATION UNIT

10

MACHINE TOOL

220

DISPLAY UNIT

230

STORAGE UNIT

231

TASK ITEM TABLE

| TASK ITEM | MANDATORY/ OPTIONAL | TASK STATUS |
|---|---|---|
| CREATION/EDITING OF MACHINING PROGRAM | MANDATORY SETTING | UNCOMPLETED |
| SELECTION OF MACHINING PROGRAM | MANDATORY SETTING | UNCOMPLETED |
| MEASUREMENT AND SETTING OF WORKPIECE | OPTIONAL SETTING | UNCOMPLETED |
| SETTING OF TOOL | MANDATORY SETTING | UNCOMPLETED |
| SETTING OF CUSTOM MACRO VARIABLE | MANDATORY SETTING | UNCOMPLETED |
| ⋮ | ⋮ | ⋮ |

| X | Y | Z |
|---|---|---|
| 21.4 | 43.6 | 0.332 |
| 23.55 | 2.5 | 3.5 |
| 0.32 | 44.8 | 5.4 |
| ... | ... | ... |

SETTING OF WORKPIECE COORDINATES   113

EDIT   SELECTION   WORKPIECE   TOOL   MACRO

TOOL SETTINGS

| TOOL NUMBER | TOOL NAME | TOOL DIAMETER | TOOL LENGTH |
|---|---|---|---|
| T1 | DRILL | 1.2 | 3.2 |
| T2 | FRAISE | 4.4 | 4.5 |
| | | | |
| | | | |
| ⋯ | ⋯ | ⋯ | ⋯ |

121(1) 121(2) 121(3) 121(4) 121(5) 121(6) 121(7) 121(8)

EDIT SELECTION WORKPIECE TOOL MACRO 100 110 114 120 130

131(1) 131(2) 131(3) 131(4) 131(5) 131(6) 131(7) 131(8) 131(9) 131(10)

CONTROL DEVICE

TECHNICAL FIELD

The present invention relates to a control device.

BACKGROUND ART

In setup work for a machine tool, a plurality of task items are set by performing a plurality of screen transitions.

In this regard, there is known a technology for automatically creating a desired machining program by selecting a machining mode of desired machining on a machining selection screen, displaying screens for setting the selected machining mode in a preset order, and sequentially inputting data required for the machining mode. For example, see Patent Document 1.

Patent Document 1: Japanese Unexamined Patent Application, Publication No. 2000-126937

DISCLOSURE OF THE INVENTION

Problems to be Solved by the Invention

In the setup of a machine tool, it is necessary to set a plurality of task items such as tool setting and workpiece coordinate setting. However, in machining such as cutting, the order of setting is not determined, and the work is performed in the order in which each operator finds easy to work. Thus, some setup work takes time, and it is burdensome for an operator to work while remembering what further tasks remain to be performed in the setup work. In addition, operating the machine tool in a state in which a necessary task is left undone causes damage to the machine tool or a workpiece.

Therefore, it is desired that the operator can easily confirm the work progress without having to remember what further tasks must be performed in setup work.

Means for Solving the Problems

A control device according to one aspect of the present disclosure is provided with: an extraction unit configured to extract each of a plurality of task items included in setup work for next machining by a machine tool as a mandatory setting or an optional setting based on a machine configuration including at least one of a number of axes and a number of systems of the machine tool to be set; a determination unit configured to dynamically determine whether each of the plurality of task items extracted as a mandatory setting or an optional setting corresponds to either a mandatory setting or an optional setting depending on operation contents in the setup work for the machine tool during a period from completion of most recent machining performed by the machine tool to a present time; and an operation control unit configured not to permit a machining operation by the machine tool when an uncompleted or an unupdated mandatory setting remains.

Effects of the Invention

According to the aspect, the operator can easily confirm the work progress without having to remember what further tasks must be performed in the setup work.

BRIEF DESCRIPTION OF THE DRAWINGS

FIG. 1 is a functional block diagram showing a functional configuration example of a control system according to one embodiment;

FIG. 3 is a diagram showing an example of a task item table;

FIG. 5 is a diagram showing an example of a screen including a setting screen for creating/editing a machining program;

FIG. 7 is a diagram showing an example of a screen including a setting screen for measuring and setting a workpiece;

FIG. 8 is a diagram showing an example of a screen including a setting screen for setting tools;

PREFERRED MODE FOR CARRYING OUT THE INVENTION

Figure 2:
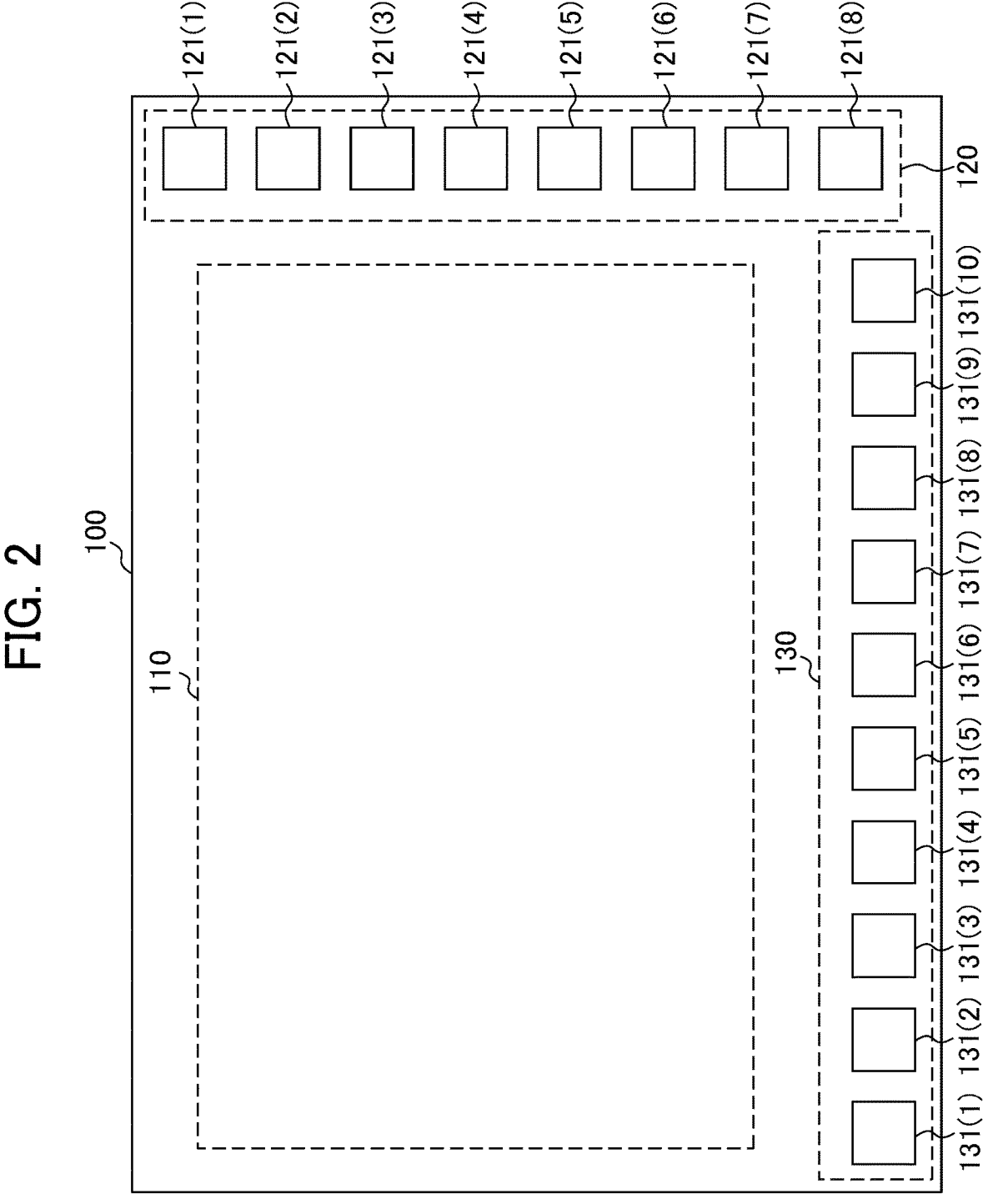
FIG. 2 is a diagram showing an example of a screen displayed on a display.

One embodiment will now be described with reference to the drawings. Here, five task items of "creation/editing of machining program", "selection of machining program", "measurement and setting of workpiece", "setting of tool", and "setting of custom macro variable" are exemplified as task items in setup work. The present invention is not limited to these task items, and can be applied to setting items other than those described above.

One Embodiment

FIG. 1 is a functional block diagram showing a functional configuration example of a control system according to one embodiment. As shown in FIG. 1, a control system 1 includes a machine tool 10 and a control device 20.

The machine tool 10 and the control device 20 may be directly connected to each other via a connection interface (not shown). The machine tool 10 and the control device 20 may be connected to each other via a network such as a local area network (LAN). In this case, the machine tool 10 and the control device 20 may include a communication unit (not shown) for communicating with each other through such a connection.

The control device 20 may be included in the machine tool 10.

The machine tool 10 is a machine tool known to those skilled in the art, and operates based on an operation command from the control device 20.

The machine tool 10 may store, for example, a tool management table (not shown) for managing all tools attached to a main shaft (not shown) of the machine tool 10 in a storage unit (not shown) such as a hard disk drive (HDD) included in the machine tool 10. The control device 20, which will be described later, may acquire a tool name, tool diameter, tool length, and the like from the tool management table (not shown) of the machine tool 10 based on a tool number or the like set in a machining program during setup work.

The machine tool 10 may store, for example, configuration information indicating the mechanical configuration of the machine tool 10 such as the number of axes, the number of systems, and the presence or absence of a pallet changer, in a storage unit (not shown) of the machine tool 10. The control device 20, which will be described later, may acquire the machine configuration of the machine tool 10 such as the number of axes, the number of systems, and the presence or absence of a pallet changer, from the configuration information of the machine tool 10 at the time of setup work.

<Control Device 20>

The control device 20 is a numerical control device known to those skilled in the art. The control device 20 creates an operation command based on an instruction received from an operator via an input device (not shown) such as a touch panel included in the control device 20 or a machining program to be executed, and transmits the created operation command to the machine tool 10. Thus, the control device 20 controls the operation of the machine tool 10.

As shown in FIG. 1, the control device 20 includes a control unit 210, a display unit 220, and a storage unit 230. The control unit 210 includes a machining completion detection unit 211, an operation detection unit 212, an extraction unit 213, a determination unit 214, a display control unit 215, an operation control unit 216, and a notification unit 217. The storage unit 230 includes a task item table 231.

The display unit 220 is a display device such as a liquid crystal display (LCD), and includes a touch panel (not shown) disposed on the front face of the display device. As shown in FIG. 2, in the case of setup work, the display unit 220 displays a screen 100 including the setting screens of task items "creation/editing of machining program", "selection of machining program", "measurement and setting of workpiece", "setting of tool", and "setting of custom macro variable" included in the setup work, based on a control instruction from the display control unit 215, which will be described later. The setting of each of the task items "creation/editing of machining program", "selection of machining program", "measurement and setting of workpiece", "setting of tool", and "setting of custom macro variable" may be performed, for example, based on an input operation of the operator via a touch panel (not shown).

The screen 100 shown in FIG. 2 includes, for example, an area in which the setting screen for a task item selected by the operator is displayed (hereinafter, also referred to as a "setting display area 110"). The screen 100 includes an area in which soft keys 121(1) to 121(*m*) are displayed in a vertical line (hereinafter, also referred to as a "vertical key display area 120"), and an area in which soft keys 131(1) to 131(*n*) are displayed in a horizontal line (hereinafter, also referred to as a "horizontal key display area 130").

m and n are positive integers.

The soft keys 121(1) to 121(*m*) are each assigned, for example, a function of transitioning a setting screen for each task item such as "creation/editing of machining program" of setup work to be displayed in the setting display area 110 by the display control unit 215, which will be described later. The soft keys 131(1) to 131(*n*) are each assigned a function of a screen operation for each setting screen by the display control unit 215, which will be described later.

The soft keys 121(1) to 121(*m*) may each be assigned a function of a screen operation, and the soft keys 131(1) to 131(*n*) may each be assigned a function of transitioning a setting screen for each task item.

Hereinafter, description will be made assuming that m is 8 and n is 10, but the same operation is performed when m is a number other than 8 and n is a number other than 10. When it is not necessary to distinguish each of the soft keys 121(1) to 121(8) individually, the soft keys 121(1) to 121(8) are collectively referred to as "soft keys 121". When it is not necessary to distinguish each of the soft keys 131(1) to 131(10) individually, the soft keys 131(1) to 131(10) are collectively referred to as "soft keys 131".

The storage unit 230 is a read only memory (ROM), a HDD, or the like, and may store the task item table 231 together with various control programs.

<Task Item Table 231>

FIG. 3 is a diagram showing an example of the task item table 231.

As shown in FIG. 3, the task item table 231 includes, for example, "task items" in the setup work for the next machining by the machine tool 10 during the period from the completion of the most recent machining by the machine tool 10 to the present time. The task item table 231 includes "mandatory/optional" and "task status" corresponding to each task item.

With respect to "task items" in the task item table 231, task items necessary for the setup work for the next machining by the machine tool 10 during the period from the completion of the most recent machining to the present time are set. In FIG. 3, as the task items, "creation/editing of machining program", "selection of machining program", "measurement and setting of workpiece", "setting of tool", "setting of custom macro variable", and the like may be set.

With respect to "mandatory/optional" in the task item table 231, a task item in which setting of each of the task items is mandatory (hereinafter, also referred to as a "mandatory setting") or a task item in which setting of each of the task items is optional (hereinafter, also referred to as an "optional setting") is stored based on the extraction result of the extraction unit 213 described later or the determination result of the determination unit 214 described later.

With respect to "task status" in the task item table 231, uncompleted or unupdated, or completed or updated is stored based on the determination result of the determination unit 214 described later.

<Control Unit 210>

The control unit 210 includes a central processing unit (CPU), ROM, RAM, complementary metal-oxide-semiconductor (CMOS) memory, and the like, which are known to those skilled in the art and configured to communicate with each other via a bus.

The CPU is a processor that entirely controls the control device 20. The CPU reads a system program and an application program stored in the ROM via the bus, and controls the entire control device 20 in accordance with the system program and the application program. Thus, as shown in FIG. 1, the control unit 210 is configured to realize the functions of the machining completion detection unit 211, the operation detection unit 212, the extraction unit 213, the determination unit 214, the display control unit 215, the operation control unit 216, and the notification unit 217. The RAM stores a variety of data such as temporary calculation data and display data. The CMOS memory is backed up by a battery (not shown), and is configured as a non-volatile memory in which a storage state is held even when the power of the control device 20 is turned off.

The machining completion detection unit 211 detects, for example, that machining of one workpiece performed by the machine tool 10 has been completed.

The operation detection unit 212 detects operation contents such as an operator's operation on the machine tool 10 and an operator's input operation via a touch panel (not shown) of the display unit 220.

Specifically, for example, the operation detection unit 212 detects the operation contents of operations (e.g., an operation of changing the selection of the main program of each system, an operation of changing the main program of each system, an operation of changing the tool number (T number) or tool offset value of each system, an operation of changing workpiece coordinates, and an operation of changing a custom macro variable) related to the setup work for the next machining by the machine tool 10 during the period from the time when the completion of the most recent machining is detected by the machining completion detection unit 211 to the present time.

<Extraction Unit 213>

The extraction unit 213 extracts each of a plurality of task items included in the setup work for the next machining by the machine tool 10 as a mandatory setting or an optional setting based on the machine configuration including at least one selected from the number of axes and the number of systems of the machine tool 10 to be set. The extraction unit 213 updates "mandatory/optional" in the task item table 231 based on the extraction result.

Specifically, for example, when the completion of the most recent machining is detected by the machining completion detection unit 211, the extraction unit 213 acquires, from the machine tool 10, configuration information indicating the machine configuration such as the number of axes, the number of systems, and the presence or absence of a pallet changer in the machine tool 10. When a pallet changer is included in the machine tool 10 in the acquired configuration information, the extraction unit 213 may extract the task item "measurement and setting of workpiece" as an "optional setting" because measurement and setting of workpiece coordinates are unnecessary for each machining. On the other hand, when a pallet changer is not included in the machine tool 10, the extracting unit 213 may extract the task item "measurement and setting of workpiece" as a "mandatory setting" because measurement and setting of workpiece coordinates are necessary for each machining.

Since it is necessary to set workpiece coordinates for the number of axes based on the number of axes in the acquired configuration information, the extraction unit 213 may extract the task item "measurement and setting of workpiece" as a "mandatory setting".

Since it is necessary to set the main program for each system and set the tool offset for each system based on the number of systems in the acquired configuration information, the extraction unit 213 may extract the task items "selection of machining program" and "setting of tool" as "mandatory settings".

<Determination Unit 214>

After each of the task items of the setup work is extracted as a mandatory setting or an optional setting by the extraction unit 213, the determination unit 214 dynamically determines whether each of the task items of the setup work extracted as either a mandatory setting or an optional setting corresponds to either a mandatory setting or an optional setting depending on the operation contents in the setup work detected by the operation detection unit 212.

Specifically, when there is a change in the selection of the main program of each system in the operation contents detected by the operation detection unit 212, since it is necessary to set a tool offset with respect to the setting at the time of the completion of the most recent machining, the determination unit 214 determines the task item "setting of tool" as a "mandatory setting" even if the task item is extracted as an optional setting by the extraction unit 213, and dynamically changes "mandatory/optional" in the task item table 231. When the selection of the main program of each system is changed, since it is necessary to change the custom macro variable with respect to the setting at the time of the completion of the most recent machining, the determination unit 214 determines the task item "setting of custom macro variable" as a "mandatory setting" even if the task item is extracted as an optional setting by the extraction unit 213, and dynamically changes "mandatory/optional" in the task item table 231.

When there is a change in the main program of each system in the operation contents detected by the operation detection unit 212, since it may not be necessary to change the tool offset with respect to the setting at the time of the completion of the most recent machining, the determination unit 214 determines the task item "setting of tool" as an "optional setting" even if the task item is extracted as a mandatory setting by the extraction unit 213, and dynamically changes "mandatory/optional" in the task item table 231. When the main program of each system is changed, since it may not be necessary to change the custom macro variable with respect to the setting at the time of the completion of the most recent machining, the determination unit 214 determines the task item "setting of custom macro variable" as an "optional setting" even if the task item is extracted as a mandatory setting by the extraction unit 213, and dynamically changes "mandatory/optional" in the task item table 231.

When there is a change in the tool number (T number) or tool offset value of each system in the operation contents detected by the operation detection unit 212, since it is necessary to change the machining program with respect to the setting at the time of the completion of the most recent machining, the determination unit 214 determines the task item "creation/editing of machining program" as a "mandatory setting" even if the task item is extracted as an optional setting by the extraction unit 213, and dynamically changes "mandatory/optional" in the task item table 231. Alternatively, when the tool number (T number) or tool offset value of each system is changed, since it is necessary to change the selection of the machining program with respect to the setting at the time of completion of the most recent machining, the determination unit 214 may determine the task item "selection of machining program" as a "mandatory setting" even if the task item is extracted as an optional setting by the extraction unit 213, and may dynamically change "mandatory/optional" in the task item table 231.

When there is a change in workpiece coordinates in the operation contents detected by the operation detection unit 212, since it may not be necessary to change the machining program with respect to the setting at the time of the completion of the most recent machining, the determination unit 214 determines the task item "creation/editing of machining program" as an "optional setting" even if the task item is extracted as a mandatory setting by the extraction unit 213, and dynamically changes "mandatory/optional" in the task item table 231. It is not necessary to modify the machining program, for example, when the workpiece coordinates are changed for fine adjustment. Therefore, the determination unit 214 changes the task item "creation/editing of machining program" in the task item table 231 to an "optional setting".

When there is a change in a custom macro variable in the operation contents detected by the operation detection unit 212, since it is necessary to change the machining program with respect to the setting at the time of the completion of the most recent machining, the determination unit 214 determines the task item "creation/editing of machining program" as a "mandatory setting" even if the task item is extracted as an optional setting by the extraction unit 213, and dynamically changes "mandatory/optional" in the task item table 231. Alternatively, when a custom macro variable is changed, since it is necessary to change the selection of the machining program with respect to the setting at the time of completion of the most recent machining, the determination unit 214 may determine the task item "selection of machining program" as a "mandatory setting" even if the task item is extracted as an optional setting by the extraction unit 213, and may dynamically change "mandatory/optional" in the task item table 231.

For example, in the task of the task item "creation/editing of machining program", when the operation detection unit 212 detects an operation such as pressing the soft key 131 of "save" by the operator and a machining program is created or edited, the determination unit 214 may update the "task status" of the task item "creation/editing of machining program" in the task item table 231 from an uncompleted or unupdated status to a completed or updated status.

In the task of the task item "selection of machining program", when the operation detection unit 212 detects an operation such as pressing the soft key 131 of "setting" by the operator and the main program is set in the control device 20, the determination unit 214 may update the "task status" of the task item "selection of machining program" in the task item table 231 from an uncompleted or unupdated status to a completed or updated status.

In the task of the task item "measurement and setting of workpiece", when the operation detection unit 212 detects an operation such as pressing the soft key 131 of "setting" by the operator and workpiece coordinates are set in the control device 20, the determination unit 214 may update the "task status" of the task item "measurement and setting of workpiece" in the task item table 231 from an uncompleted or unupdated status to a completed or updated status.

In the task of the task item "setting of tool", when the operation detection unit 212 detects an operation such as pressing the soft key 131 of "setting" by the operator and a tool is set in the control device 20, the determination unit 214 may update the "task status" of the task item "setting of tool" in the task item table 231 from an uncompleted or unupdated status to a completed or updated status.

In the task of the task item "setting of custom macro variable", when the operation detection unit 212 detects an operation such as pressing the soft key 131 of "setting" by the operator and a custom macro variable is set in the control device 20, the determination unit 214 may update the "task status" of the task item "setting of custom macro variable" in the task item table 231 from an uncompleted or unupdated status to a completed or updated status.

<Display Control Unit 215>

The display control unit 215 dynamically changes each of the task items "creation/editing of machining program", "selection of machining program", "measurement and setting of workpiece", "setting of tool", and "setting of custom macro variable" so as to be discernible as either a mandatory setting or an optional setting based on the determination result of the determination unit 214, and displays it on the display unit 220.

Figure 4:
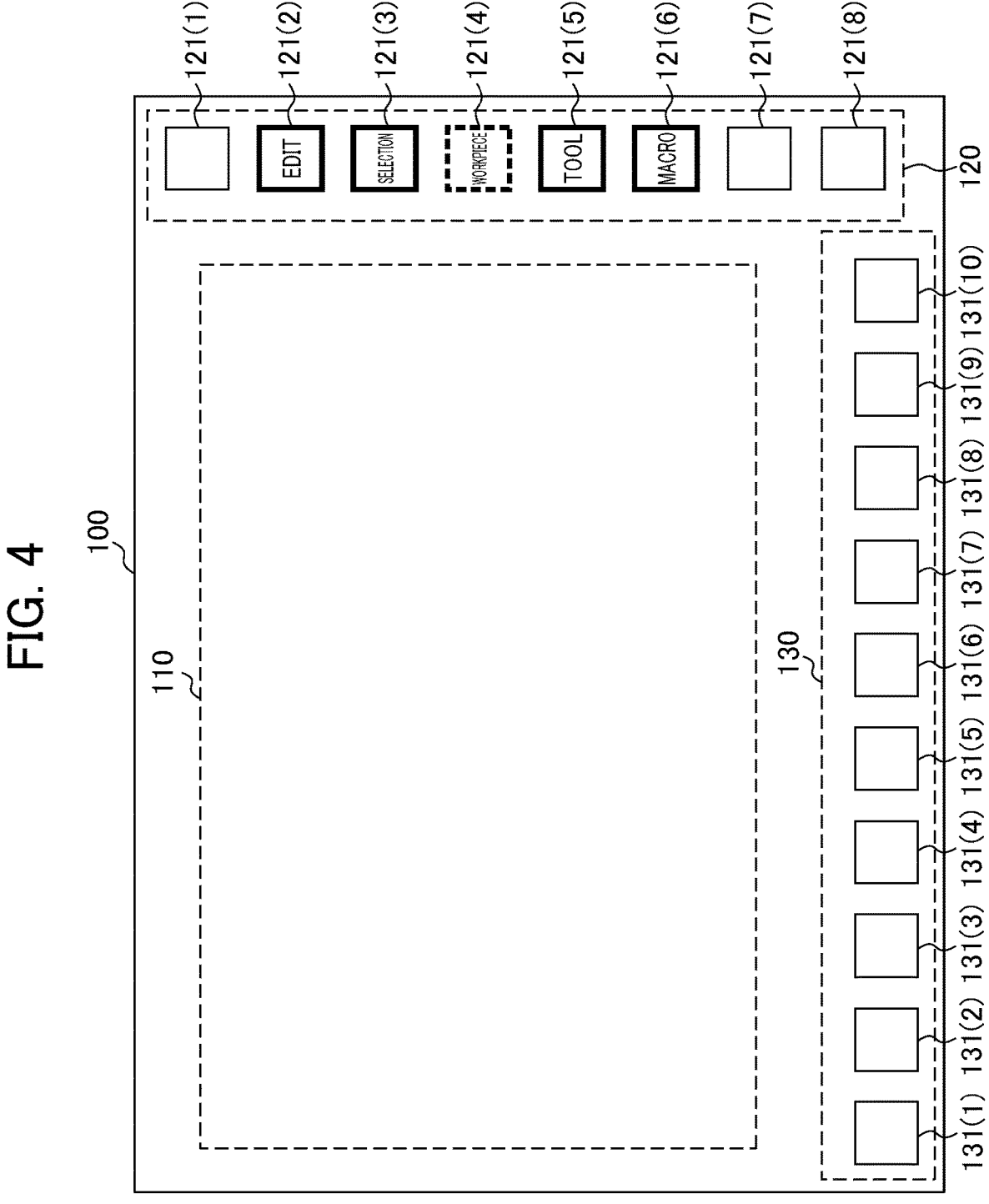
FIG. 4 is a diagram showing an example of a screen in which task items are displayed in a discernible manner.

Specifically, as shown in FIG. 4, for example, the display control unit 215 dynamically displays the display form (e.g., the color, type, thickness of the frame line, background color, and effect) of each of the soft keys 121 to which the functions of the task items "creation/editing of machining program", "selection of machining program", "measurement and setting of workpiece", "setting of tool", and "setting of custom macro variable" are respectively assigned so as to be discernible as either a mandatory setting or an optional setting based on the determination result of the determination unit 214.

Hereinafter, a description will be given of a case where the determination unit 214 determines the task items "creation/editing of machining program", "selection of machining program", "setting of tool", and "setting of custom macro variable" as mandatory settings, and the task item "measurement and setting of workpiece" as an optional setting. However, the same applies to the case where the mandatory or optional setting of each of the task items "creation/editing of machining program", "selection of machining program", "measurement and setting of workpiece", "setting of tool", and "setting of custom macro variable" is dynamically changed according to the determination result of the determination unit 214.

As shown in FIG. 4, for example, the display control unit 215 may respectively assign functions for transiting to setting screens of the task items "creation/editing of machining program", "selection of machining program", "measurement and setting of workpiece", "setting of tool", and "setting of custom macro variable" to the soft keys 121(2) to 121(6), and may display names such as "edit", "selection", "workpiece", "tool", and "macro". The display control unit 215 may display the display form (e.g., the color, type, and thickness of the frame line of the soft key, and the color of the background of the soft key) of an unset/unupdated mandatory setting so as to be different from the display form of the optional setting. For example, the display control unit 215 may display, on each of the soft keys 121(2) to 121(6), a picture or the like indicating each of the task items "creation/editing of machining program", "selection of machining program", "measurement and setting of workpiece", "setting of tool", and "setting of custom macro variable".

The display control unit 215 displays the frames of the soft keys 121(2), 121(3), 121(5), and 121(6) as thick lines in order to emphasize that the task items "creation/editing of machining program", "selection of machining program", "setting of tool", and "setting of custom macro variable" are uncompleted/unupdated mandatory settings. On the other hand, since the machine tool 10 includes a pallet changer, the display control unit 215 displays the frame of the soft key 121(4) as a thick broken line in order to emphasize that the task item "measurement and setting of workpiece" is an uncompleted/unupdated optional setting.

Thus, the operator does not have to remember what further tasks must be performed, and thus it is possible to prevent task omissions.

The display control unit 215 emphasizes the frame line by changing the line type depending on the mandatory setting and the optional setting, but the present invention is not limited thereto. For example, the display control unit 215 may display the display form (e.g., the color, type, and thickness of the frame line of the soft key, and the color of the background of the soft key) of the unset/unupdated mandatory setting so as to be different from the display form of the optional setting.

Transitioning to the setting screen for each of the task items "creation/editing of machining program", "selection of machining program", "measurement and setting of workpiece", "setting of tool", and "setting of custom macro variable" will be described. In the following description, the case where the setting screen is transitioned in the order of the task items "creation/editing of machining program", "selection of machining program", "measurement and setting of workpiece", "setting of tool", and "setting of custom macro variable" will be described, but transitioning to the setting screen for each task item may be performed in an order that is easy for each operator to work.

Figure 5:
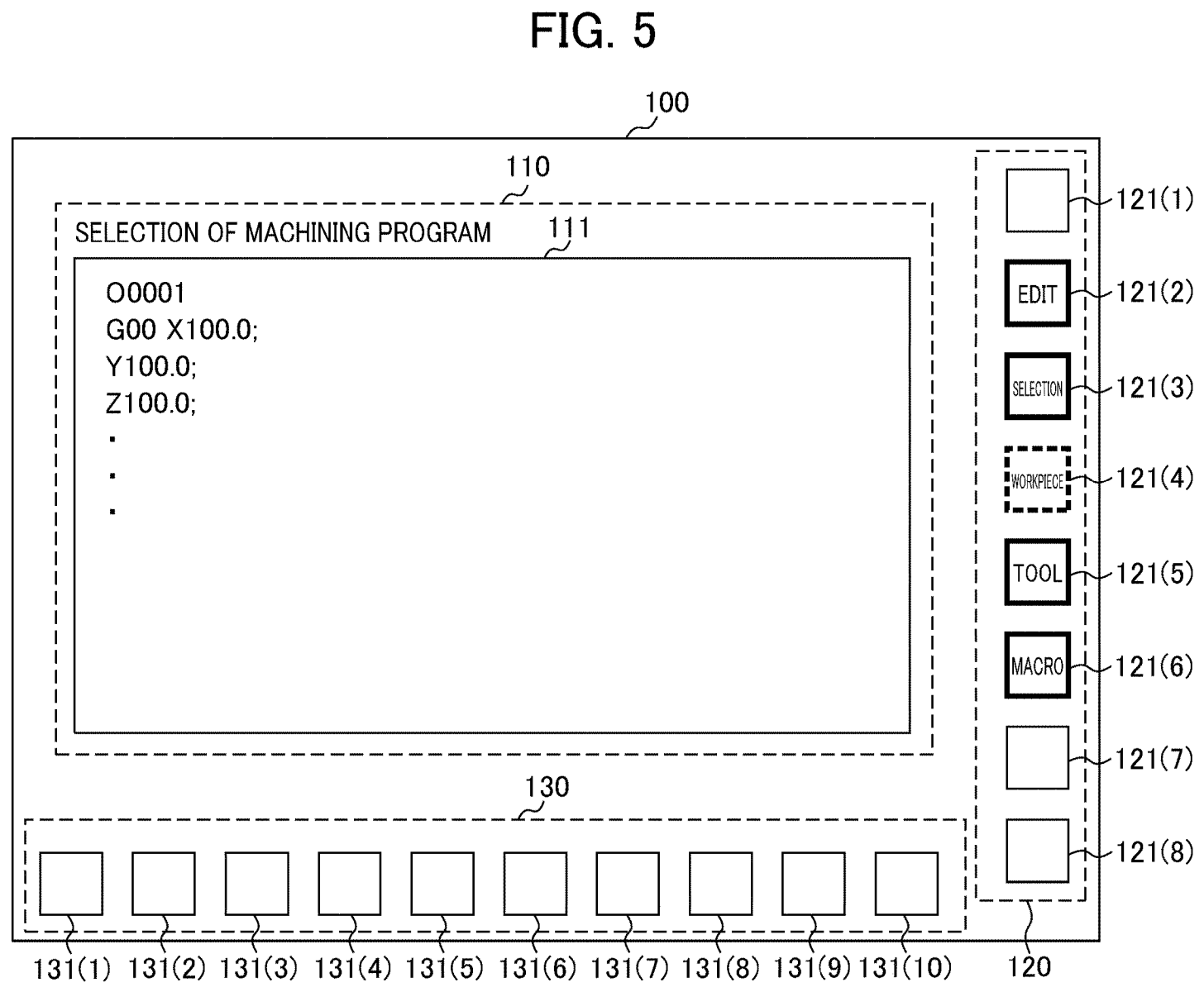

For example, when the soft key 121(2) of "editing" is pressed by the operator via the touch panel (not shown) of the display unit 220 on the screen 100 of FIG. 4, as shown in FIG. 5, the display control unit 215 displays a setting screen 111 of the task item "creation/editing of machining program" in the setting display area 110.

When a new machining program is to be created, the display control unit 215 may display the setting screen 111 in a new state, and may display, on the setting screen 111, the new machining program created by an input operation of the operator via the touch panel (not shown) of the display unit 220.

For example, when a machining program is created by partially changing an existing machining program, for example in a case where the shape of a component is partially different, the display control unit 215 may display a copied existing machining program on the setting screen 111 based on an input operation of the operator via the touch panel (not shown) of the display unit 220. The display control unit 215 may display, on the setting screen 111, a machining program partially changed by an input operation of the operator via the touch panel (not shown) of the display unit 220.

When the machine tool 10 is a machine with one system, at least one machining program is required, and when the machine tool 10 is a machine with two or more systems, at least one machining program is required for each system.

Figure 6:
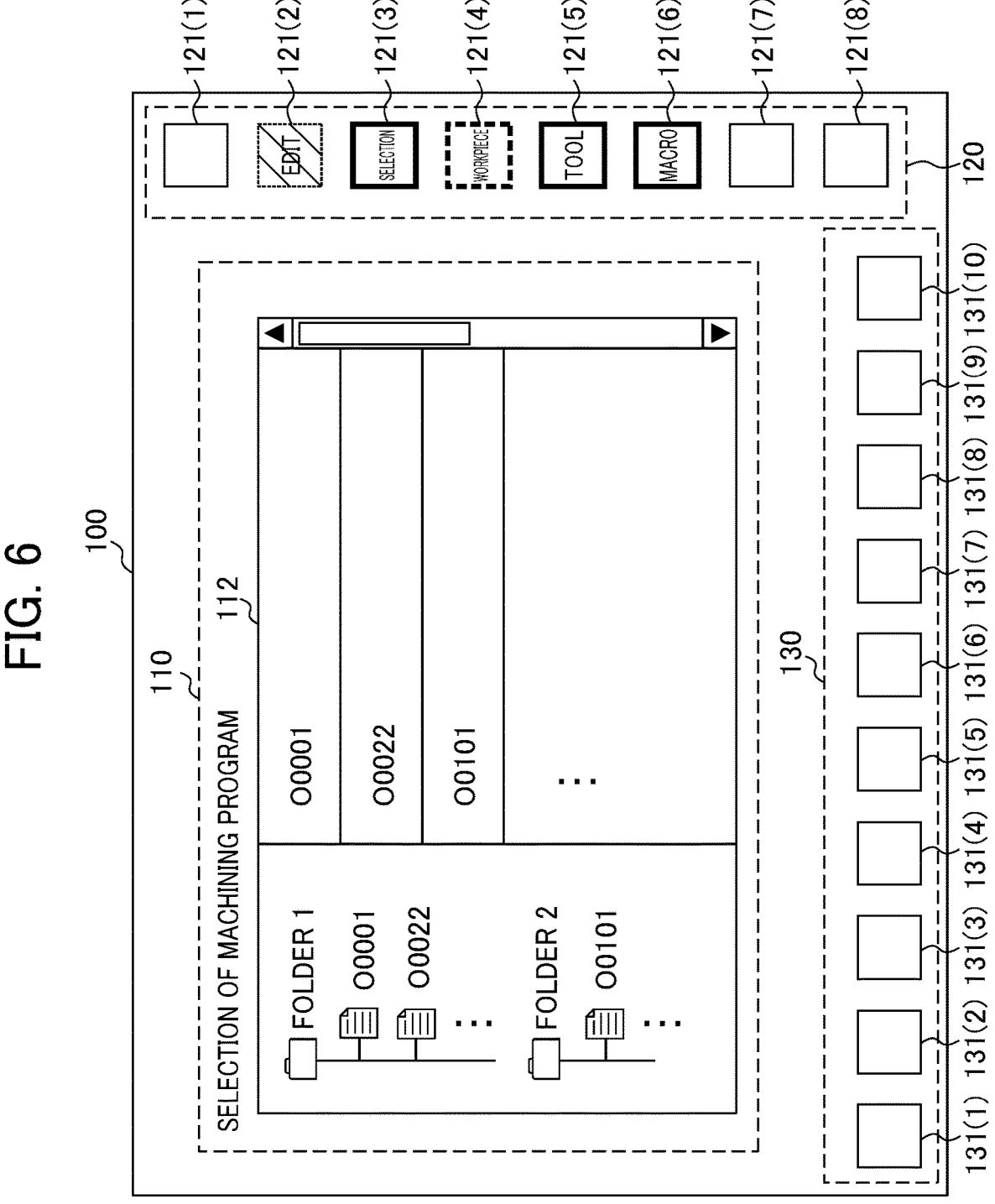
FIG. 6 is a diagram showing an example of a screen including a setting screen for selecting a machining program.

When the operator presses the soft key 121(3) of "selection" on the screen 100 of FIG. 5 via the touch panel (not shown) of the display unit 220, the display control unit 215 displays the screen 100 that has transitioned from the setting screen 111 of the task item "creation/editing of machining program" in FIG. 5 to a setting screen 112 of the task item "selection of machining program" in FIG. 6. As shown in FIG. 6, the display control unit 215 may display the soft key 121(2) of the task item "creation/editing of machining program" in a shaded manner so as to emphasize completion because the task status of the task item "creation/editing of machining program" is completed or updated in the task item table 231.

The display control unit 215 preferably displays the display form (e.g., the color, type, and thickness of the frame line, background color, and effect) of the completed task item so as to be different from the display forms of the mandatory setting and the optional setting.

As shown in FIG. 6, for example, the display control unit 215 may display the configurations of folders for storing the file of each machining program on the left side of the setting screen 112, and may display a list of machining programs set for each system on the right side of the setting screen 112 and registered in the control device 20. For example, a machining program is selected and set for each system based on an input operation of the operator via the touch panel (not shown) of the display unit 220. In the case of FIG. 6, for example, when the machine tool 10 has a machine configuration of two systems, the machining program "O0022" may be set as a main program for a first system, and the machining program "O0001" may be set as a main program for a second system.

When the operator presses the soft key 121(4) of the "workpiece" on the screen 100 in FIG. 6 via the touch panel (not shown) of the display unit 220, the display control unit 215 displays the screen 100 that has transitioned from the setting screen 112 of the task item "selection of machining program" in FIG. 6 to a setting screen 113 of the task item "measurement and setting of workpiece" in FIG. 7. As shown in FIG. 7, the display control unit 215 may display the soft keys 121(2) and 121(3) in a shaded manner indicating completion since the task statuses of the task items "creation/editing of machining program" and "selection of machining program" are completed or updated in the task item table 231.

As shown in FIG. 7, for example, when the machine tool 10 is a three-axis machine tool, the display control unit 215 displays, on the setting screen 113, the workpiece coordinates of X-axis, Y-axis, and Z-axis set for a workpiece placed on the machine tool 10.

Here, in the setting of the workpiece coordinates, for example, the operator moves a touch sensor or the like attached to the machine tool 10 by a handle operation and brings it into contact with end surfaces of the workpiece in X, Y, and Z directions, whereby values in the X, Y, and Z directions are measured. The control device 20 sets the measured values in the X, Y, and Z directions as workpiece coordinates.

The machine tool 10 may be a machine tool such as a five-axis machine tool other than a three-axis machine tool, and the coordinates of the workpiece are set in the same manner as in the case of three axes.

When no pallet changer is included in the machine tool 10, the task item "measurement and setting of workpiece" must always be set as a mandatory setting every time a workpiece is set in the machine tool 10.

When the operator presses the soft key 121(5) of the "tool" on the screen 100 in FIG. 7 via the touch panel (not shown) of the display unit 220, the display control unit 215 displays the screen 100 that has transitioned from the setting screen 113 of the task item "measurement and setting of workpiece" in FIG. 7 to a setting screen 114 of the task item "setting of tool" in FIG. 8. As shown in FIG. 8, since the task statuses of the task items "creation/editing of machining program", "selection of machining program", and "measurement and setting of workpiece" are completed or updated in the task item table 231, the display control unit 215 may display the soft keys 121(2) to 121(4) in a shaded manner indicating that the task items are completed.

As shown in FIG. 8, for example, the display control unit 215 displays tool numbers, tool names, tool diameters, tool lengths, and the like, which were set, on the setting screen 114.

Here, in the setting of a tool, for example, the various sizes of the tool are measured using a tool presetter, a touch sensor, or the like, and the measured values are set as offsets (tool diameter, tool length) of the tool.

The tool number (T number) must correspond to the description of the machining program. For example, when "T1" is set to be used in the machining program, "T1" must be set to "drill". In other words, when the main program is changed, the tool offsets to be set to each tool number (T number) must also be changed.

The tool number (T number) and the tool name may be set based on, for example, a tool management table (not shown) acquired by the control device 20. The tool management table is stored in a storage unit (not shown) of the machine tool 10.

Figure 9:
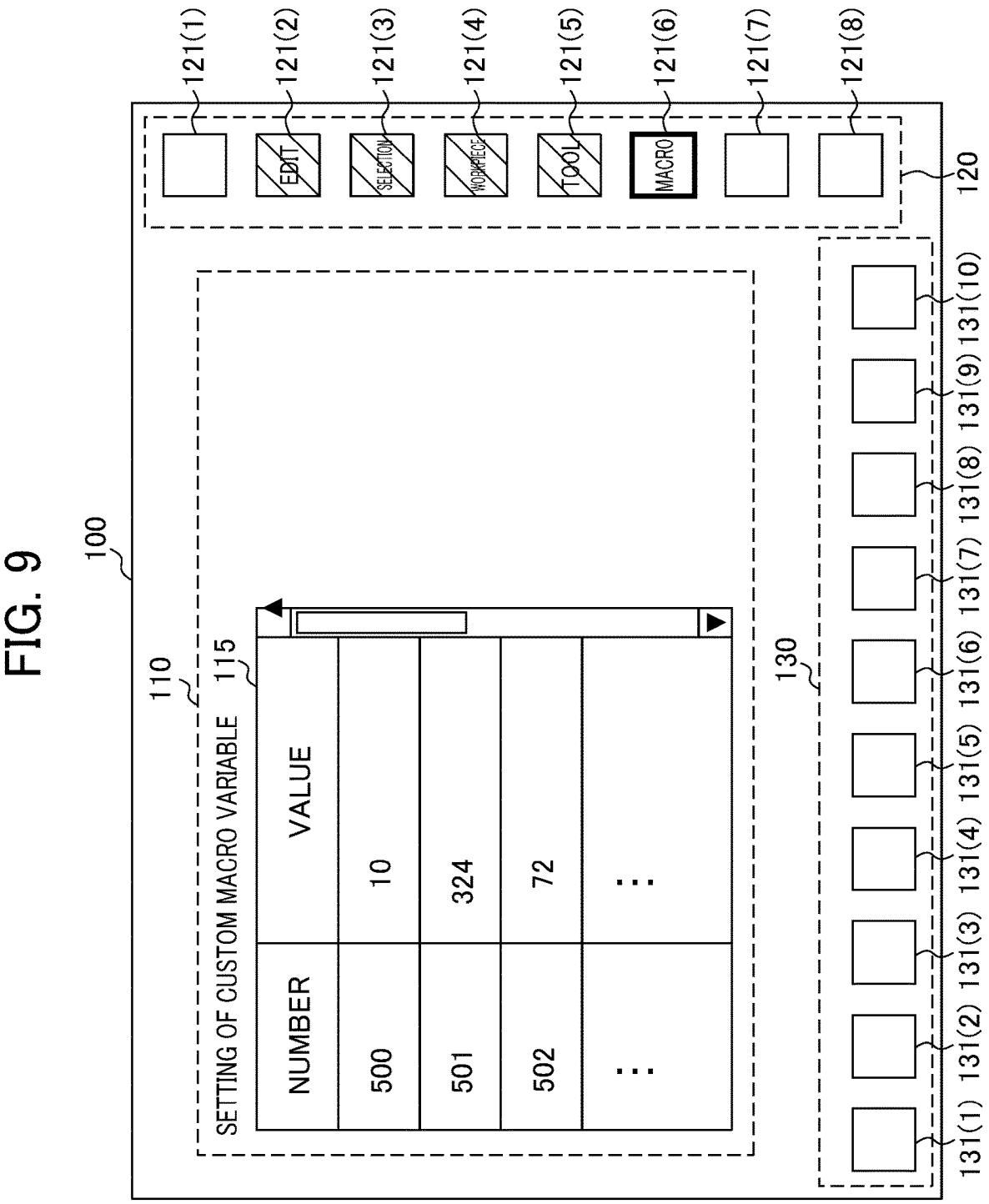
FIG. 9 is a diagram showing an example of a screen including a setting screen for setting custom macro variables.

When the operator presses the soft key 121(6) of "macro" on the screen 100 in FIG. 8 via the touch panel (not shown) of the display unit 220, the display control unit 215 displays the screen 100 that has transitioned from the setting screen 114 of the task item "setting of tool" in FIG. 8 to the setting screen 115 of the task item "setting of custom macro variable" in FIG. 9. As shown in FIG. 9, since the task statuses of the task items "creation/editing of machining program", "selection of machining program", "measurement and setting of workpiece", and "setting of tool" are completed or updated, the display control unit 215 may display the soft keys 121(2) to 121(5) in a shaded manner indicating that the task items are completed.

As shown in FIG. 9, for example, the display control unit 215 displays a value set for each custom macro variable (e.g., "500", "501", and "502") on the setting screen 115.

When the task of the task item "setting of custom macro variable" is finished, the display control unit 215 may display the soft key 121(6) of the task item "setting of custom macro variable" in a shaded manner indicating completion based on the task item table 231.

The custom macro variable must match the description of the machining program. That is, when the main program is changed, the custom macro variable must also be changed. However, in the case of a machining program that does not use a custom macro variable, setting is unnecessary.

When receiving an alert indicating that the machining operation is not permitted because there is an uncompleted or unupdated mandatory setting from the notification unit 217 described later, the display control unit 215 may display, on the display unit 220, a warning indicating that "The machining operation is not permitted because there is an uncompleted or unupdated mandatory setting" or "Please set a mandatory setting before starting machining". The display control unit 215 may display the warning on the display unit 220, and may automatically transition to the setting screen for an uncompleted or unupdated mandatory setting.

The operation control unit 216 monitors and controls the operation states of the machine tool 10 and the control device 20.

Specifically, for example, when receiving an instruction of the machining operation such as pressing a start button (not shown) or the like of the machining operation provided in the machine tool 10 or the control device 20 by the operator, the operation control unit 216 confirms whether an uncompleted or unupdated mandatory setting remains based on the task item table 231 stored in the storage unit 230. When an uncompleted or unupdated mandatory setting remains, the operation control unit 216 does not permit the machining operation by the machine tool 10. Then, the operation control unit 216 may cause the notification unit 217 described below to output a warning indicating that the machining operation is not permitted because an uncompleted or unupdated mandatory setting remains.

Thus, it is possible to avoid erroneous machining execution when a mandatory setting is omitted, and it is possible to prevent damage to the machine tool 10 and a workpiece due to an operation error.

The notification unit 217 may output a warning indicating that the machining operation is not permitted because an uncompleted or unupdated mandatory setting remains based on an instruction from the operation control unit 216, and may display the output warning on the display unit 220 via the display control unit 215.

<Setting Process of Control Device 20>

The flow of the setting process of the control device 20 will be described with reference to FIG. 10.

Figure 10:
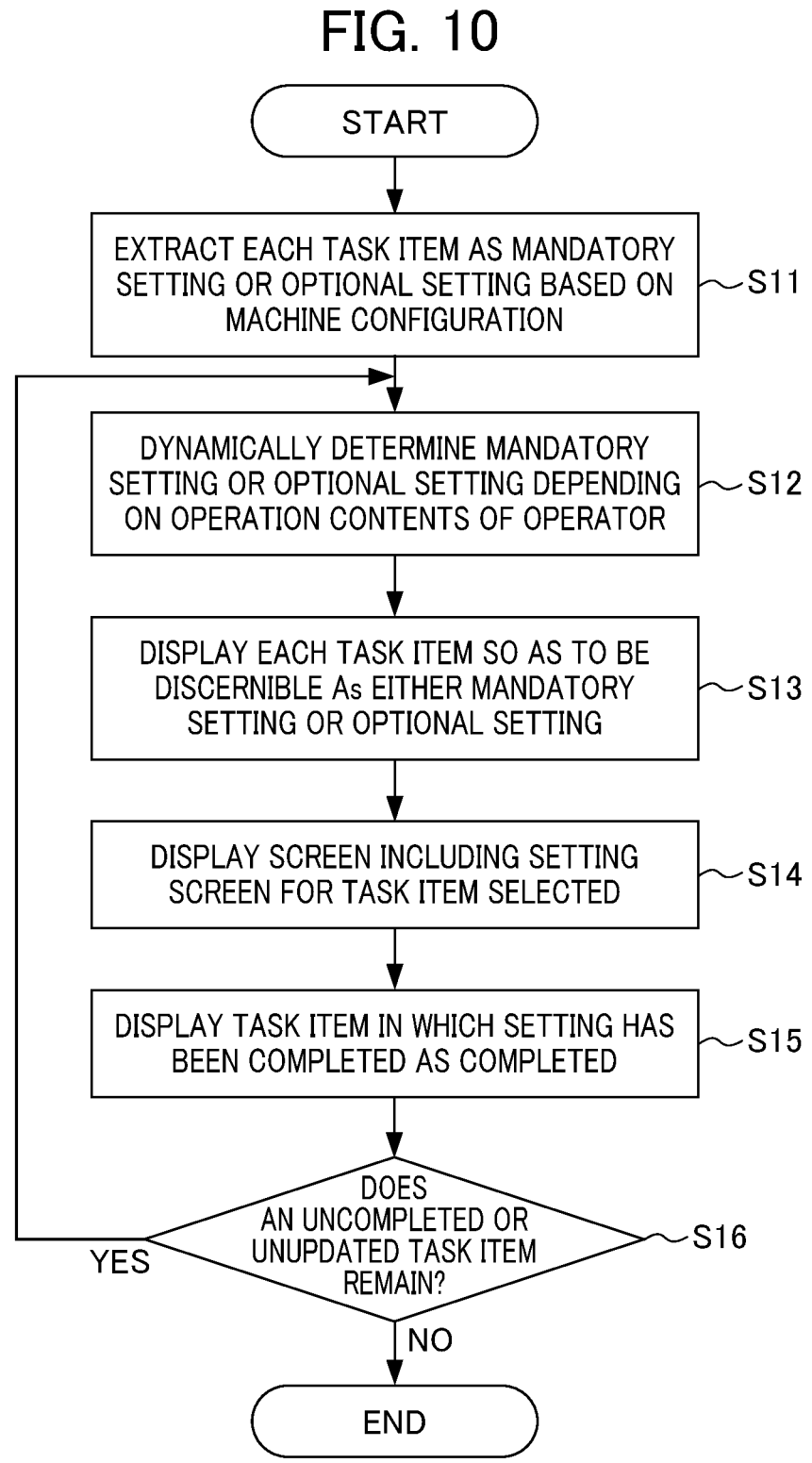
FIG. 10 is a flowchart illustrating the setting processing of a control device.

FIG. 10 is a flowchart illustrating the setting process of the control device 20. The flow shown here is executed every time setup work is performed.

In Step S11, based on the machine configuration of the machine tool 10, the extraction unit 213 extracts each of a plurality of task items for the next machining by the machine tool 10 as a mandatory setting or an optional setting.

In Step S12, the determination unit 214 dynamically determines whether each of the task items in the setup work extracted as a mandatory setting or an optional setting corresponds to either a mandatory setting or an optional setting depending on the operation contents of the operator during the period from the completion of the most recent machining detected by the operation detection unit 212 to the present time.

In Step S13, the display control unit 215 displays the soft key 121 of each of the task items on the display unit 220 so as to be discernible as either a mandatory setting or an optional setting based on the determination result.

In Step S14, the display control unit 215 displays the screen 100 including the setting screen for a task item selected by the operator pressing the soft key 121 via the touch panel (not shown) of the display unit 220.

In Step S15, every time the operation control unit 216 determines that the setting of the task item selected in Step S14 has been completed, the display control unit 215 displays the soft key 121 of the task item in a display form indicating completion.

In Step S16, the determination unit 214 determines whether an uncompleted or unupdated task item remains based on the task item table 231 stored in the storage unit 230. When an uncompleted or unupdated task item remains, the process returns to Step S12. On the other hand, when no uncompleted or unupdated task item remains, the process ends.

In the processing of Step S16, when the operation control unit 216 receives an instruction of the machining operation by the machine tool 10 from the operator, the operation control unit 216 may confirm whether an uncompleted or unupdated mandatory setting remains based on the task item table 231 stored in the storage unit 230. When an uncompleted or unupdated mandatory setting remains, the operation control unit 216 may cause the notification unit 217 to output a warning indicating that the machining operation is not permitted because an uncompleted or unupdated mandatory setting remains. The display control unit 215 may display a warning indicating that the machining operation is not permitted because an uncompleted or unupdated mandatory setting remains, which has been output by the notification unit 217, and may automatically transition to the setting screen for the uncompleted or unupdated mandatory setting.

Thus, it is possible to prevent the machine tool 10 and a workpiece from being damaged due to an operation error.

As described above, the control device 20 according to the embodiment extracts each of a plurality of task items of the setup work for the next machining by the machine tool 10 as a mandatory setting or an optional setting based on the machine configuration of the machine tool 10. The control device 20 dynamically determines whether each of the task items of the setup work extracted as a mandatory setting or an optional setting corresponds to either a mandatory setting or an optional setting depending on the operation contents in the setup work for the machine tool 10 during the period from the completion of the most recent machining to the present time. The control device 20 dynamically displays each of the task items determined as a mandatory setting or an optional setting so as to be discernible. Thus, the control device 20 allows the operator to easily confirm a work progress without having to remember what further tasks must be performed in the setup work and can prevent task omissions.

In addition, when there is an omission of a mandatory setting, the control device 20 does not permit the machine tool 10 to execute machining. Thereby, damage to the machine tool 10 and a workpiece due to an operation error can be prevented.

Although one embodiment has been described above, the control device 20 is not limited to the above embodiment, and includes modifications, improvements, and the like within the scope of achieving the object.

<Modification>

In the above-described embodiment, the control device 20 assigns each of the task items of the setup work to the soft keys 121 in the vertical key display area 120, but the present invention is not limited thereto. For example, the control device 20 may hierarchically display the task items.

Figure 11:
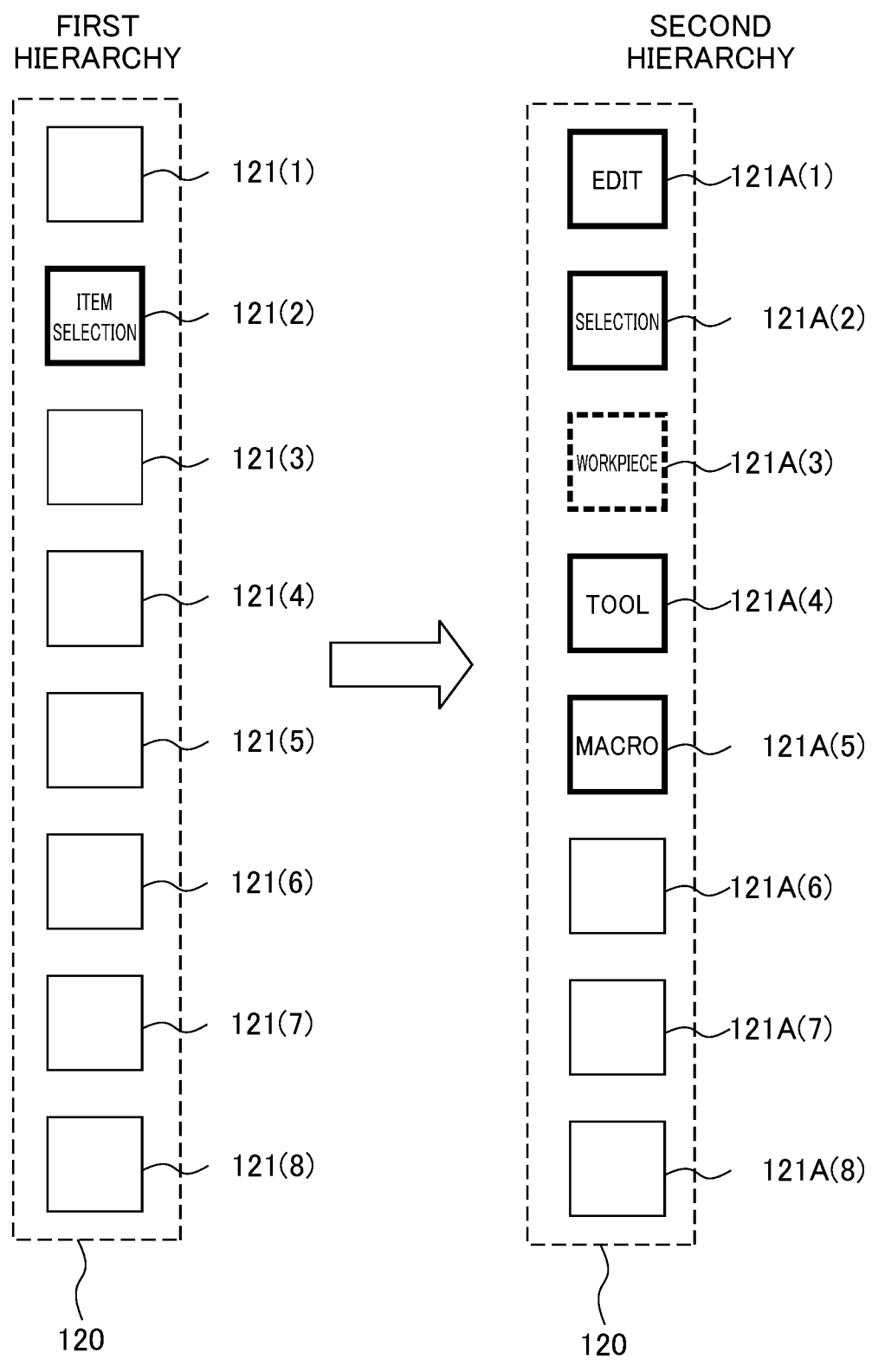
FIG. 11 is a diagram showing an example of hierarchical display of soft keys.

FIG. 11 is a diagram showing an example of hierarchical display of the soft keys 121.

As shown in FIG. 11, the control device 20 assigns a function of "item selection" for hierarchically displaying the task items to one soft key 121(2) among the soft keys 121 of the first hierarchy. When the operator presses the soft key 121(2), the control device 20 may display, for example, the soft keys 121A(1) to 121A(8) of the task items set in the second hierarchy in the vertical key display area 120. The second-hierarchy soft keys 121A(1) to 121A(8) correspond to each of the first-hierarchy soft keys 121(1) to 121(8).

In this case, it is preferable that the soft key 121(2) of the "item selection" of the first hierarchy is displayed so as to emphasize that an uncompleted or unupdated mandatory setting remains when an uncompleted or unupdated mandatory setting remains in the task items of the second hierarchy. Further, it is preferable that the soft key 121(2) of the "item selection" of the first hierarchy is displayed so as to emphasize that an uncompleted or unupdated optional setting remains when no uncompleted or unupdated mandatory setting remains and an uncompleted or unupdated optional setting remains in the task items of the second hierarchy.

In the embodiment, each function included in the control device 20 can be realized by hardware, software, or a combination thereof. Here, being realized by software means that it is realized by a computer reading and executing a program.

The program can be stored and provided to a computer using various types of non-transitory computer readable media. The non-transitory computer readable media includes various types of tangible storage media. Examples of the non-transitory computer readable media include magnetic recording media (e.g., flexible disks, magnetic tapes, and hard disk drives), magneto-optical recording media (e.g., magneto-optical disks), CD-ROMs (read only memories), CD-Rs, CD-R/Ws, semiconductor memories (e.g., mask ROMs, PROMs (programmable ROMs), EPROMs (erasable PROMs), flash ROMs, and RAMs). The program may also be provided to a computer by various types of transitory computer readable media. Examples of the transitory computer readable media include electrical signals, optical signals, and electromagnetic waves. The transitory computer readable media can supply the program to the computer via a wired communication path, such as an electric wire or an optical fiber, or a wireless communication path.

The steps of describing the program recorded in the recording medium include not only the processing performed in time series along the order but also the processing performed in parallel or individually without necessarily being processed in time series.

In other words, the control device of the present disclosure can take various embodiments having the following configurations.

(1) A first aspect of the present disclosure provides a control device 20. The control device 20 includes an extraction unit 213 configured to extract each of a plurality of task items included in setup work for next machining by a machine tool 10 as a mandatory setting or an optional setting based on a machine configuration including at least one of a number of axes and a number of systems of the machine tool 10 to be set, a determination unit 214 configured to dynamically determine whether each of the plurality of task items extracted as a mandatory setting or an optional setting corresponds to either a mandatory setting or an optional setting depending on operation contents in the setup work for the machine tool 10 during a period from completion of most recent machining performed by the machine tool 10 to a present time, and an operation control unit 216 configured not to permit a machining operation by the machine tool 10 when an uncompleted or an unupdated mandatory setting remains.

According to the control device 20, the operator can easily confirm the work progress without having to remember what further tasks must be performed in the setup work.

(2) The control device 20 according to (1) may further include a display control unit 215 that displays, on a display unit 220, each of the plurality of task items so as to be discernible as either a mandatory setting or an optional setting based on a determination result of the determination unit 214.

This enables the control device 20 to reliably set the mandatory settings.

(3) The control device 20 according to (2) may further include a notification unit 217 configured to output a warning when the operation control unit 216 does not permit the machining operation by the machine tool 10. The display control unit 215 may display the warning on the display unit 220.

Thus, the control device 20 can prevent the machine tool 10 or a workpiece from being damaged due to an operation error.

(4) The control device 20 according to (2) or (3), wherein the display control unit 215 may transition to a setting screen for the uncompleted or the unupdated mandatory setting when the operation control unit 216 does not permit the machining operation by the machine tool 10.

This enables the control device 20 to reliably set the mandatory settings before the machining operation.

(5) The control device 20 according to any one of (2) or (4), wherein the display control unit 215 may display a task item in which setting has been completed or updated among the plurality of task items so as to be distinguishable from the mandatory setting or the optional setting.

Thus, the control device 20 can prevent the machine tool 10 or a workpiece from being damaged due to an operation error when a task omission occurs.

EXPLANATION OF REFERENCE NUMERALS

1 control system
10 machine tool
20 control device

210 control unit
211 machining completion detection unit
212 operation detection unit
213 extraction unit
214 determination unit
215 display control unit
216 operation control unit
217 notification unit
220 display unit
230 storage unit
231 task item table

The invention claimed is:

1. A control device, comprising:

a memory that stores a program; and a processor configured to execute the program and control the control device to:

extract each of a plurality of task items including at least creating/editing a machining program, selecting a machining program, measuring and setting a workpiece, setting a tool, and setting a custom macro variable in setup work for next machining by a machine tool as a mandatory setting or an optional setting based on a machine configuration including at least one of a number of axes and a number of systems of the machine tool to be set;

detect an operation content of an operator's operation on the machine tool;

dynamically determine whether each of the plurality of task items extracted as a mandatory setting or an optional setting corresponds to either a mandatory setting or an optional setting when there is at least a change in the machining program of each system, a change in the tool number or tool offset value of each system, a change in workpiece coordinates, or a change in a custom macro variable in operation contents in the setup work for the machine tool during a period from completion of most recent machining performed by the machine tool to a present time, and update a task status of a task item from an uncompleted or unupdated status to a completed or updated status when at least a save operation in the task item of creating/editing the machining program, or at least a setting operation in the task item of selecting the machining program, measuring and setting the workpiece, setting the tool, or setting the custom macro variable is detected; and not to permit a machining operation by the machine tool when a task item as an uncompleted or an unupdated mandatory setting remains among the plurality of task items.

2. The control device according to claim 1, wherein the processor displays, on a display unit, each of the plurality of task items so as to be discernible as either a mandatory setting or an optional setting based on a determination result.

3. The control device according to claim 2, wherein the processor outputs a warning when the processor does not permit the machining operation by the machine tool, wherein the processor displays the warning on the display unit.

4. The control device according to claim 2, wherein the processor transitions to a setting screen for the uncompleted or the unupdated mandatory setting when the processor does not permit the machining operation by the machine tool.

5. The control device according to claim 2, wherein the processor displays a task item in which setting has been completed or updated among the plurality of task items so as to be distinguishable from the mandatory setting or the optional setting.

* * * * *